United States Patent Office 3,520,698
Patented July 14, 1970

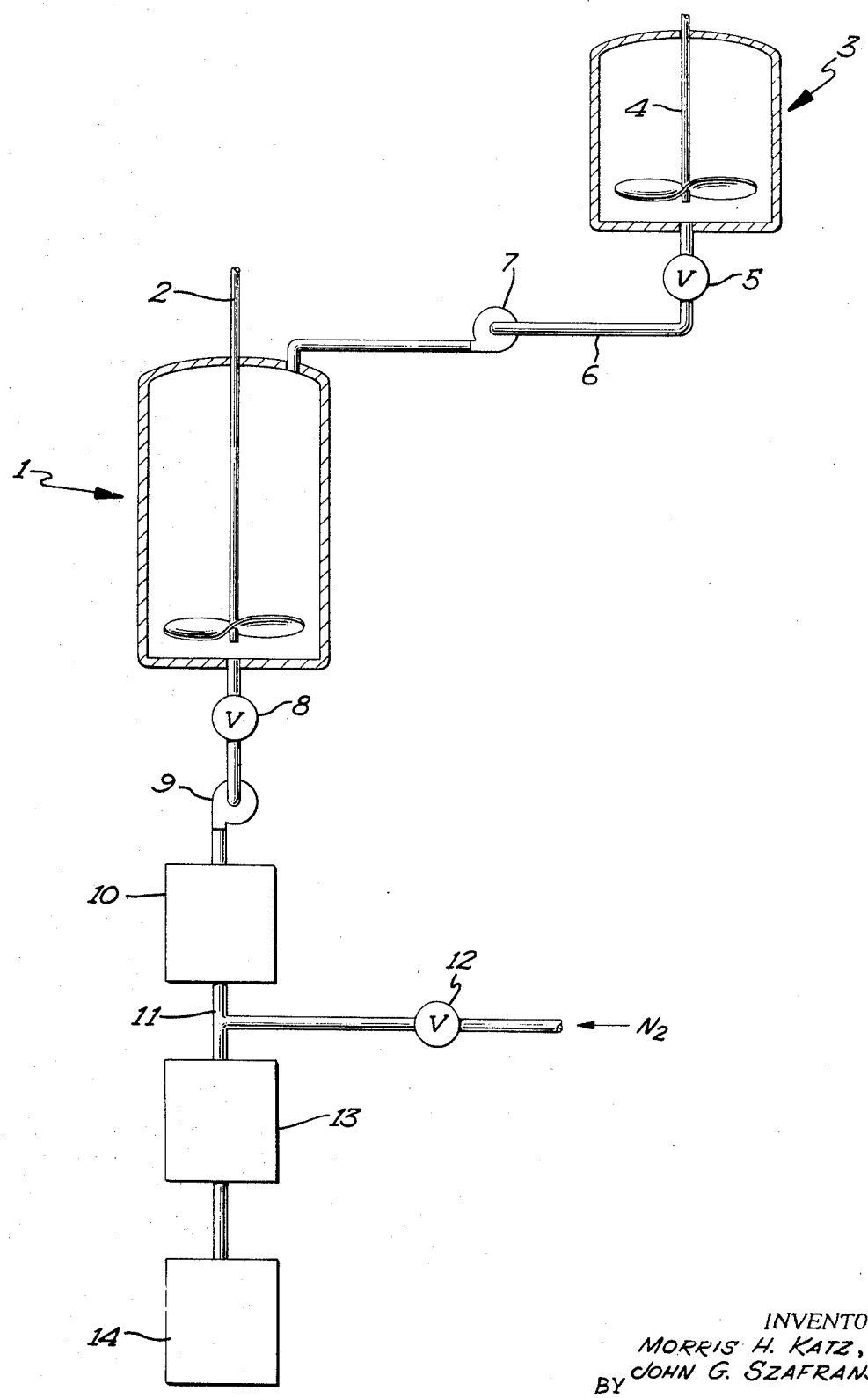

3,520,698
PROCESS FOR PREPARING AERATED ICINGS
Morris H. Katz, St. Louis Park, and John G. Szafranski, Minneapolis, Minn., assignors to The Pillsbury Company, Minneapolis, Minn., a corporation of Delaware
Filed Dec. 19, 1966, Ser. No. 602,612
Int. Cl. A23g 3/00
U.S. Cl. 99—139          9 Claims

ABSTRACT OF THE DISCLOSURE

Aerated icings exhibiting exceptional shelf line characteristics are prepared under processing conditions which substantially eliminate molecular oxygen in the resultant product. Improved storage stability, taste and textural characteristics are imparted to the resultant product by processing the appropriate icing ingredients under controlled temperature and sequential processing steps.

---

This invention relates to aerated icings. More particularly, the present invention relates to a method of preparing aerated icings containing corn syrup, sugar, shortening and the product thereof.

Icings generally contain, as basic ingredients, water and sugar. Properties and characteristics of icings can be modified by the proportion of constituents and the additives used in conjunction with the water and sugar. Cream or buttercream icings contain substantial amounts of fat or shortening which premits the aeration thereof. Aerated icings are generally applied to baked goods, confections such as cakes, sweet rolls, pastries, etc.

Heretofore, the art has sought to provide a fully aerated icing product suitable for storage in a sealed container under ambient conditions and stable against degradation. Such aerated icing would not necessitate the conventional aeration step prior to its application to bakery products but could be applied directly by the consumer to bakery products. Unfortunately, attempts to provide such "ready-to spread icings" have encountered problems in respect to providing an icing having the proper mouthfeel, texture and stability against degradation. Typical degradation problems encountered include rancidification of the shortening, molds and yeast growths, product deaeration, liquid exudation therefrom, running and/or absorption of the icing on the bakery product. Another problem connected with aerated icings is the formation of large sugar crystals therein which result in an undesirable gritty mouthfeel.

It is an object of the present invention to provide a method for preparing aerated icings which have exceptional shelf life.

It is a further object of the present invention to provide an aerated icing which is substantially free from yeast and molds and a method for preparing the same.

Another object of the present invention is to provide a method of preparing icings which possess superior taste and texture and the products produced thereby.

The drawing is a diagrammatic illustration of suitable apparatus for practicing the method of the invention.

According to the present invention there is provided a method for preparing an aerated icing product which comprises:

(a) Providing a heated, aqueous admixture consisting essentially of 15 parts by weight corn syrup, from 40 to 80 parts by weight sugar and from 5 to 10 parts by weight water at a temperature ranging from 135° F. to 150° F.;

(b) Cooling the heated, aqueous admixture to a temperature ranging from about 90° F. to about 125° F. to provide a semi-solid mass substantially free from sugar crystals greater than 50 microns in size;

(c) Adding to the semi-solid mass, while maintaining the temperature thereof from about 90° F. to about 125° F., at least 2 parts by weight but less than 7 parts by weight water per 15 parts by weight corn syrup contained in said semi-solid mass; and, (d) Vigorously agitating the semi-solid mass containing the added water with a shortening product that is substantially free of molecular oxygen in the presence of an inert gas at a temperature of less than 90° F. to provide an aerated icing.

In preparing the aerated icings, there is provided a hot, aqueous admixture consisting essentially of 15 parts by weight corn syrup, from 40 to 80 parts by weight sugar and from about 5 to about 10 parts by weight water. Although the sequence of mixing the heated, aqueous admixture ingredients is not critical, better results in respect to resultant product and process are achieved by dissolving 15 parts by weight corn syrup into about 5 to about 10 parts by weight hot water (e.g., 135° F. to 212° F.). After the corn syrup has dissolved in the hot water, from 40 to 80 parts by weight sugar is added to the hot aqueous corn syrup medium. By first dissolving the corn syrup into water, incorporation of the sugar into the hot, aqueous admixture is expedited.

Employable corn syrups include the commercially available corn syrups which typically contain from about 17 to about 22 percent by weight water. It has been found, however, that a superior aerated icing product is obtainable by the utilization of a corn syrup having a disaccharide (i.e., maltose) to monosaccharide (i.e., dextrose) ratio of at least 3:1 and preferably greater than 5:1. These corn syrups are generally identified in the art as high maltose corn syrups. Employment of high maltose corn syrups prevents excessive run off and absorption of the icing product when the product is applied to the edible base article.

After the corn syrup has been dissolved in the water, from 40 to 80 parts sugar is added to the hot, aqueous medium. Employable sugars include cane and beet sugars, dextrose, etc. The initial sugar added to the hot, aqueous corn syrup medium can be in the form of coarse, granulated sugar, however, upon obtainment of a saturated solution, any additional sugar added thereto is in the form of comminuted sugar (e.g., powdered sugar having a particle size less than 50 microns and preferably less than about 40 microns).

In providing the hot, aqueous medium, it is essential that the temperature and amounts of ingredients be within the range specified herein. Distinct processing and product characteristics are obtained by employing about 55 to about 66 parts by weight sugar, 15 parts by weight corn syrup and about 6 to about 8 parts by weight water at a temperature ranging from about 140° F. to less than 150° F. Preferred process conditions for providing the hot, aqueous medium are about 6 to 8 parts water, about 62 parts by weight comminuted sugar at a temperature of about 142° F. to about 146° F.

The hot, aqueous admixture processed as disclosed herein provides an effective manner of destroying substantially all the yeast and mold developing organisms and also permits the incorporation of a large amount of sweetening agent in the final product without developing excessively large sugar crystals therein.

After the aqueous admixture has been heated for a period of time sufficient to destroy the organisms and dissolve most of the sweetening agent therein (usually about 15 minutes), the hot, aqueous admixture is cooled to a temperature of at least about 95° F. but less than about 125° F. to provide a semi-solid mass substantially free from crystals greater than 50 microns in size. Cooling of the hot, aqueous admixture provides the formation of micro-fine sugar crystals. Preferably, the hot, aqueous admixture is cooled from about 105° F. to about 120° F.

There is then added to this semi-solid mass (maintained at least about 95° F. to about 125° F.) an additional amount of microbiologically acceptable water (e.g., drinking water). The amount of added water is at least 2 parts by weight but less than 7 parts by weight per 15 parts by weight corn syrup. Advantageously, from 3 to 5 parts by weight water is added to a cooled, aqueous admixture maintained at about 105° F. to about 115° F. with about 4 parts being preferred. The water added during this stage of processing should be thoroughly admixed so that a homogenous mass is obtained.

The second addition of water after cooling of the hot, aquous admixture provides the proper moisture level for the resultant frosting product while maintaining the sugar in the micro-crystalline form, thus, providing the desired texture and mouthfeel in the ultimate whipped icing.

Whipping and foam stability are enhanced by incorporation either in the heated, aqueous admixture or in the added water step (hereinbefore described) of a hydrophilic surface active agent in an amount up to 2.0 parts by weight per 15 parts by weight corn syrup. Hydrophilic surface active agents include polyoxyethylene (20) sorbitan monolaurate, polyoxyethylene (15) sorbitan monopalmitate, polyoxyethylene (20) sorbitan trioleate, hydroxylated lecithin, salts of fatty acids (e.g., sodium stearate), sodium caseinate, polyoxyethylene lauryl ether, polyoxyethylene oleate, polyoxyethylene stearate, polyoxyethylene palmitate, polyoxyethylene sorbitan tristearate, polyoxyethylene monostearate, polyoxyethylene mannitan monolaurate, polyoxyethylene sorbitan oleate laurate, polyoxyethylene ether alcohol and mixtures thereof. The preferred edible hydrophilic surface active agent is polyoxyethylene (20) sorbitan monostearate.

Other water-dispersible icing additives such as lemon, lime, coconut, butterscotch, cocoa and vanilla flavoring agent, salt, coloring agents, stabilizers, preservatives and the like are preferably added along with the additional water although such additives may be previously provided in the heated, aqueous admixture.

The semi-solid mass containing the added water is vigorously agitated with a shortening product that is substantially free from molecular oxygen at a temperature less than 90° F. to provide an aerated icing.

It has been found that shortening products obtained from commercial processors are generally contaminated with molecular oxygen in amounts sufficient to have an adverse effect upon the stability of the resultant icing. Although molecular oxygen can be removed from the shortening at any stage of processing prior to aeration, greater process and product benefits are derived if the shortening product is substantially free from molecular oxygen prior to its admixing with the semi-solid mass. Removal of molecular oxygen from shortenings can be conveniently accomplished by melting the shortening and purging the melted shortening. During subsequent processing steps further contamination with molecular oxygen should be avoided.

Shortenings employed herein are those typically employed in preparing icings. Exemplary shortenings are those which are normally solid at 20° C. and include the hydrogenated vegetable oils of cottonseeds, corn, coconuts, peanuts, palms and soybeans. It is also possible to employ a non-hydrogenated oil in combination with a solid fat such as tristearin which would provide the same texture and viscosity as the hydrogenated vegetable oils. The amount of vegetable oils employed in preparing the icing sof the invention ranges from about 5 to about 30 parts by weight shortening per 15 parts by weight corn syrup. Most generally, the amount of shortening ranges from about 8 to about 20 parts by weight per 15 parts corn syrup with an amount of about 10 to about 15 parts by weight being preferred.

The shortening may be added anytime prior to the aeration step. For example, the shortening can be added to the hot, aqueous medium, along with the added water or after the additional water step. Preferably, it is added after the additional water step.

An edible lipophilic emulsifier is necessary in the instant whipped icings in order to disperse the shortening throughout the cooled, aqueous admixture and provide the icings of the present invention. Exemplary edible lipophilic emulsifiers are sorbitan monostearate, sorbitan monolaurate, sorbitan monopalmitate, sorbitan tristearate, monolaurate, sorbitan monopalmitate, sorbitan tristearate, sorbitan monooleate, sorbitan trioleate, sorbitan sesquioleate, glycerol sorbitan laurate, glycerol mannitan laurate, glyceryl-lacto esters of fatty acids (e.g., the lactooleate, lacto-palmitate, lacto-stearate), oxystearin, monoglyceryl citrate, stearyl monoglyceryl citrate, sucrose monostearate, lecithin, propylenglycol mono- and diesters of fats and fatty acids, mono- and diglycerides of edible fatty acids, mixtures thereof and the like. Glyceryl monostearate is the preferred lipophilic emulsifier. An amount of lipophilic emulsifier of at least 1 to about 10 percent by weight of the shortening will provide the necessary emulsifying effect for preparing the whipped icings herein. The preferred amount of lipophilic emulsifier is about 3 percent by weight of the shortening.

Although the lipophilic emulsifier can be added to any stage of the process before the icing is whipped, it is preferably admixed with the shortening prior to its admixture with the cooled, semi-solid mass.

The shortening product (substantially free from molecular oxygen) and semi-solid masses containing the added water is vigorously agitated in the presence of an inert gas under process conditions substantially free from molecular oxygen. Vigorous agitation thereof is conducted at a temperature less than 90° F. and usually above about 70° F. with a range of about 75° F. to about 85° F. being the preferred. Vigorous agitation in the presence of an edible inert gas whips the product into an aerated icing. The vigorous agitation step can be conducted after cooling the product to less than 90° F. or may be conducted simultaneously under rapid cooling conditions such as provided by a scraped surface heat exchanger.

The whipped or aerated icings are then packaged into a suitable container under conditions substantially free from molecular oxygen, molds and yeast (e.g., the employment of ultra-violet light).

A more comprehensive description of the invention may be had by reference to the accompanying drawing which depicts diagrammatically, suitable apparatus for practicing the instant method.

In practicing a preferred embodiment of the invention, there is added 21 pounds of water into mixing vessel 1. Mixing vessel 1 is provided with a mixing agitator 2, a surface scraper to prevent scorching of the sugar (not shown) and a thermally controlled heating and cooling means (not shown). The water in vessel 1 is heated to 144° F. whereupon 45 pounds of corn syrup has dissolved into the 144° F. water, 185 pounds of comminuted (10XX) sugar is added thereto. The aqueous mixture containing the corn syrup and sugar is stirred moderately for 15 minutes at 144° F.

The contents of mixing vessel 1 are then purged with nitrogen gas by conventional means and the contents are cooled from 144° F. to 110° F. while maintaining moderate agitation and continual purging thereof. After cooling 9 pounds of microbiologically acceptable water at 110° F. containing 1 pound of artificial vanilla flavor (5 percent flavor) and 0.5 pound of polyoxyethylene (20) sorbitan monostearate is added to mixing vessel 1. The added water and contents of mixing vessel 1 are then moderately agitated with mixing vessel agitator 2 for 15 minutes while purging the contents thereof with nitrogen (e.g., at a rate of 8 cubic feet per hour).

During preparation and processing of the aqueous admixture, a shortening product substantially free from molecular oxygen is prepared in shortening vessel 3. Shortening vessel 3 is provided with a nitrogen purging means similar to that employed in mixing vessel 1 and a shortening vessel stirrer 4. In shortening vessel 3, 37.5 pounds of hydrogenated vegetable shortening containing 3.0 weight percent glyceryl monostearate is added. The shortening product is heated to 140° F., moderately agitated and purged with nitrogen. Shortening valve 5 is then positioned to permit the contents thereof to be pumped through shortening conduit 6 by means of pump 7 into mixing vessel 1.

The aqueous medium (at 110° F.) containing sugar, vanilla flavor, corn syrup and shortening is homogenously mixed in mixing vessel 1 while purging the contents thereof with nitrogen. Mixing vessel valve 8 is opened and pump 9 is then engaged whereupon the contents pass through deaerator 10 through pipe 11 which is suitably provided with a nitrogen inlet valve 12. Nitrogen is fed into the pipe 11 at a rate sufficient to reduce the specific gravity of the resultant aerated icing to about 1.00. The nitrogen containing product is then passed through a scraped surface heat exchanger 13 which simultaneously whips and cools the product to 85° F. The resultant icing product issuing from heat exchanger 13 is then conveyed to a conventional filler 14 and packaged such that the gas in the headspace contains less than 3 percent oxygen by volume.

The following example is illustrative of the invention:

EXAMPLE I

Employing the apparatus disclosed in the drawing and described in the preferred embodiment of the invention hereinbefore an aerated vanilla icing was prepared. The apparatus employed was as follows:

Mixing vessel 1.—A 50 gallon stainless steel pressure vessel, manufactured by Groen Manufacturing Company, equipped with a thermally controlled heating jacket and a mechanical agitator with plastic scraper blades to prevent charring or scorching of the aqueous admixture.

Shortening vessel 3.—An 80 gallon stainless steel pressure tank provided with a thermally controlled water jacket, mechanical stirrer, plastic scraper blade and nitrogen purging means.

Deaerator 10.—A "Versator," manufactured by Cornell Machine Company, operated under mercury vacuum of 26 inches.

Scraped surface heat exchanger 13.—Two stainless steel, 6 inch by 48 inch scraped surface heat exchangers, manufactured by Cherry-Burrel Corporation, connected in series adapted to receive 25 pounds per minute.

The filler was a "Vari-Visco Cadet" manufactured by Karl Kiefer Div., Cherry-Burrel Corporation. The resultant aerated icings were packaged in a sanitary tin can.

Employing the aforementioned apparatus, the following ingredients and operating conditions were employed in preparing aerated icings:

| Apparatus | Ingredients (pounds) | Conditions |
| --- | --- | --- |
| Mixing vessel 1 | Initial: water, 21; corn syrup,[1] 45; powdered sugar, 185. | At 144° F. and mixed for 15 minutes. |
| | Subsequent addition: Drinking water, 9; vanilla, 1; polyoxyethylene (20) sorbitan monostearate, 0.5; salt, 2.0; preservative and coloring agent, 0.5. | At 110° F. and mixed for 15 minutes. |
| Shortening vessel | Hydrogenated vegetable oil having a Wiley melting point of 114° F. and an iodine value of 30 to 35, 37.5. | At 140° F., purged and agitated for 30 minutes. |

[1] High maltose corn syrup having a dextrose equivalent of 48.5 and 43° Baumé.

The resultant aerated frosting had a specific gravity of 1.03 and possessed a smooth, creamy mouthfeel without a concomitant stringy, greasy texture. The product was not gritty (i.e., contained no large sugar crystals). As packaged, the product was stable, when stored at 100° F., for at least 6 months against syneresis with no detectable microbial degradation. Substantially no change in specific gravity was observed when the product was stored for at least 1 year at 75° F., thus indicating the aerated frosting was stable against deaeration. Stability of the product against rancidity due to oxidative degradation was exhibited by no detectable rancidity when the packaged product was stored at least 6 months at 100° F. and at least 1 year at 75° F. The aerated product had a superior flavor. No syneresis or product degradation was observed when the product was subjected to a freeze-thaw test which consisted of freezing the product at 0° F. for 2 days and thawing the product at 75° F. for 2 days and repeating the test for 5 times.

What is claimed is:

1. A method for preparing an aerated, shortening containing icing product wherein the shortening product has been added as an icing ingredient prior to the aeration of the icing ingredient, said method comprising the steps of:
   (a) providing a heated, aqueous medium consisting essentially of 15 parts by weight corn syrup, from 40 to 80 parts by weight sugar and from 5 to 10 parts by weight water at a temperature ranging from 135° F. to 150° F.
   (b) cooling the heated, aqueous medium to a temperature ranging from about 90° F. to about 125° F. to provide a semi-solid mass substantially free from sugar crystals greater than 50 microns in size;
   (c) adding to the semi-solid mass, while maintaining the temperature thereof from about 90° F. to about 125° F., at least 2 parts by weight but less than 7 parts by weight water per 15 parts by weight corn syrup contained in said semi-solid mass and admixing the semi-solid mass containing the added water to provide a homogeneous mass thereof;
   (d) subsequent to step (a) adding about 5 to about 30 parts by weight of a substantially oxygen free shortening product which contains from at least 1% to about 10% of a lipophilic emulsifier; and
   (e) aerating the homogeneous mass with said shortening product therein by vigorously agitating the same in the presence of an inert gas under conditions substantially free from molecular oxygen and at a temperature ranging from about 70° F. to less than 90° F.

2. The method according to claim 1 wherein the heated, aqueous medium consists essentially of about 55 to about 66 parts by weight sugar, 15 parts by weight corn syrup and about 6 to about 8 parts by weight water.

3. The method according to claim 2 wherein from 3 to 5 parts by weight water is added to a cooled, aqueous admixture maintained at about 105° F. to about 115° F.

4. The method according to claim 3 wherein the aqueous admixture is heated to a temperature ranging from about 140° F. to less than 150° F.

5. The method according to claim 4 wherein from about 10 to about 15 parts by weight shortening product for each 15 parts by weight corn syrup is added to the homogeneous mass prior to the vigorous agitation thereof.

6. The method according to claim 5 wherein the homogeneous mass is vigorously agitated in the presence of nitrogen at a temperature ranging from about 75° F. to about 85° F.

7. The method according to claim 6 wherein the aqueous medium is maintained at a temperature between about 142° F. to 146° F. and about 62 parts by weight comminuted sugar is employed.

8. The method according to claim 7 wherein 4 parts by weight water is added to the semi-solid mass and the aerated icing is packaged in a container that is impermeable to molecular oxygen.

9. The method according to claim 1 wherein the areated icing is packaged in a container that is impermeable to molecular oxygen under conditions substantially free from molecular oxygen.

References Cited

UNITED STATES PATENTS 3,194,666   7/1965   Bedenk et al. _____ 99—139

RAYMOND N. JONES, Primary Examiner

J. M. HUNTER, Assistant Examiner